United States Patent
Breeden, III et al.

(10) Patent No.: US 12,416,374 B2
(45) Date of Patent: *Sep. 16, 2025

(54) EXPANDABLE HOSE

(71) Applicant: Winston Products LLC, Cleveland, OH (US)

(72) Inventors: Winston H. Breeden, III, Chagrin Falls, OH (US); Troy Hatcher, Bay Village, OH (US); Grant Hauk, Burlington, OH (US); Rick Gyure, Willoughby, OH (US); Curtis Taylor, Chagrin Falls, OH (US); Mat Hanson, Lakewood, OH (US); Aaron Misener, Lakewood, OH (US); Bob Mergenhagen, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,134

(22) Filed: Jan. 25, 2024

(65) Prior Publication Data
US 2024/0167596 A1    May 23, 2024

Related U.S. Application Data

(63) Continuation of application No. 17/357,848, filed on Jun. 24, 2021, now Pat. No. 11,927,284.
(Continued)

(51) Int. Cl.
*F16L 29/00* (2006.01)
*F16L 11/12* (2006.01)
(Continued)

(52) U.S. Cl.
CPC ............ *F16L 29/007* (2013.01); *F16L 11/12* (2013.01); *F16L 11/20* (2013.01); *F16L 29/00* (2013.01);
(Continued)

(58) Field of Classification Search
CPC ........ B05B 12/087; E03C 1/025; F16L 11/12; F16L 11/20; F16L 29/00; F16L 29/002;
(Continued)

(56) References Cited

U.S. PATENT DOCUMENTS

| 700,683 A | 5/1902 | Goetze |
| 1,220,661 A | 3/1917 | Many |

(Continued)

FOREIGN PATENT DOCUMENTS

| AU | 2013201152 A1 | 5/2014 |
| CA | 2105475 A1 | 9/1993 |

(Continued)

OTHER PUBLICATIONS

US 9,334,985 B1, 05/2016, Ragner et al. (withdrawn)
The International Search Report and Written Opinion for corresponding International Patent Application No. PCT/US2021/038903, dated Sep. 28, 2021, 14 pages.

*Primary Examiner* — Kenneth Rinehart
*Assistant Examiner* — Richard K. Durden
(74) *Attorney, Agent, or Firm* — Tucker Ellis LLP

(57) ABSTRACT

Provided is a hose including a first connector assembly including a regulator assembly, a second connector assembly, and a hose assembly coupled to the first and second connector assemblies. The hose assembly includes an inner hose member having first and second ends, an outer hose member having first and second ends, a first hose connector assembly coupled to the first ends of the inner hose member and outer hose member and the first connector assembly, and a second hose connector assembly coupled to the second ends of the inner hose member and outer hose member and the second connector assembly.

20 Claims, 15 Drawing Sheets

Related U.S. Application Data

(60) Provisional application No. 63/122,104, filed on Dec. 7, 2020, provisional application No. 63/078,845, filed on Sep. 15, 2020, provisional application No. 63/071,328, filed on Aug. 27, 2020, provisional application No. 63/043,759, filed on Jun. 24, 2020.

(51) Int. Cl.
| | |
|---|---|
| *F16L 11/20* | (2006.01) |
| *F16L 33/01* | (2006.01) |
| *F16L 33/22* | (2006.01) |
| *F16L 39/02* | (2006.01) |
| *F16L 39/00* | (2006.01) |
| *G05D 16/06* | (2006.01) |
| *G05D 16/10* | (2006.01) |

(52) U.S. Cl.
CPC ............. *F16L 33/01* (2013.01); *F16L 33/225* (2013.01); *F16L 39/02* (2013.01); *F16L 39/005* (2013.01); *G05D 16/0608* (2013.01); *G05D 16/103* (2013.01); *G05D 16/106* (2013.01)

(58) Field of Classification Search
CPC ....... F16L 29/007; F16L 33/003; F16L 33/01; F16L 33/2078; F16L 33/223; F16L 33/224; F16L 33/225; F16L 33/226; F16L 33/28; F16L 35/00; F16L 35/005; F16L 39/02; F16L 55/1022; G05D 16/0608; G05D 16/103; G05D 16/106; Y10T 137/7808
USPC ..... 285/115, 116, 222.3, 239, 248, 249, 259
See application file for complete search history.

(56) References Cited

U.S. PATENT DOCUMENTS

| | | | |
|---|---|---|---|
| 2,728,356 A | 12/1955 | Brinsmade et al. | |
| 2,895,001 A | 7/1959 | Noyes et al. | |
| 2,897,603 A | 8/1959 | Behrman | |
| 3,191,971 A * | 6/1965 | Somers | F16L 35/00 285/55 |
| 3,604,451 A * | 9/1971 | Delamater | F16K 15/1402 137/516.25 |
| 3,715,454 A | 2/1973 | Kleykamp | |
| 4,159,027 A | 6/1979 | Caillet | |
| 4,300,592 A * | 11/1981 | Hartley | G05D 16/0658 137/505.25 |
| 4,669,757 A * | 6/1987 | Bartholomew | F16L 37/0985 285/55 |
| 4,841,845 A | 6/1989 | Beullens | |
| 4,939,819 A | 7/1990 | Moyer | |
| 5,023,959 A | 6/1991 | Mercer | |
| 5,158,005 A | 10/1992 | Negishi et al. | |
| 5,197,370 A | 3/1993 | Gladfelter | |
| 5,201,262 A | 4/1993 | Negishi et al. | |
| 5,257,646 A * | 11/1993 | Meyer | A01G 25/16 251/50 |
| 5,322,322 A | 6/1994 | Bark et al. | |
| 5,397,270 A * | 3/1995 | Pipp, Jr. | F16C 1/262 464/52 |
| 5,435,962 A | 7/1995 | Kramer | |
| 5,464,246 A | 11/1995 | Castro et al. | |
| 5,480,181 A | 1/1996 | Bark et al. | |
| 5,483,911 A | 1/1996 | Kubli | |
| 5,600,752 A | 2/1997 | Lopatinsky | |
| 5,649,414 A | 7/1997 | Rawdon et al. | |
| 5,839,753 A | 11/1998 | Yaniv et al. | |
| 5,881,757 A | 3/1999 | Kuster et al. | |
| 6,024,132 A | 2/2000 | Fujimoto | |
| 6,106,027 A * | 8/2000 | Mulvey | E03C 1/0403 285/251 |
| 6,126,194 A | 10/2000 | Yaniv et al. | |
| 6,202,263 B1 | 3/2001 | Harker | |
| 6,223,777 B1 | 5/2001 | Smith et al. | |
| 6,227,094 B1 | 5/2001 | Taylor et al. | |
| 6,227,579 B1 * | 5/2001 | Humphreys | F16L 27/08 285/239 |
| 6,253,539 B1 | 7/2001 | Farhangi et al. | |
| 6,279,615 B1 | 8/2001 | Lio et al. | |
| 6,374,853 B1 | 4/2002 | Callies | |
| 6,382,241 B1 | 5/2002 | Setrum | |
| 6,523,539 B2 | 2/2003 | McDonald et al. | |
| 6,698,457 B2 | 3/2004 | Hayashi et al. | |
| D499,464 S | 12/2004 | Caine | |
| 6,935,378 B2 | 8/2005 | Ikemoto et al. | |
| 6,948,527 B2 | 9/2005 | Ragner et al. | |
| 7,111,638 B2 * | 9/2006 | Johnson | F16K 17/34 137/460 |
| 7,140,595 B2 | 11/2006 | Youngberg et al. | |
| 7,156,127 B2 | 1/2007 | Moulton et al. | |
| D549,118 S | 8/2007 | Caine et al. | |
| 7,520,302 B2 | 4/2009 | Smith | |
| 7,549,448 B2 | 6/2009 | Ragner | |
| 7,654,282 B2 | 2/2010 | Lo | |
| 7,735,523 B2 | 6/2010 | Smith et al. | |
| 8,291,941 B1 | 10/2012 | Berardi | |
| 8,291,942 B2 | 10/2012 | Berardi | |
| 8,365,646 B2 | 2/2013 | Fields | |
| 8,479,776 B2 | 7/2013 | Berardi | |
| 8,714,186 B2 | 5/2014 | Ungerecht | |
| 8,757,213 B2 | 6/2014 | Berardi | |
| 8,776,836 B2 | 7/2014 | Ragner et al. | |
| 8,807,060 B2 | 8/2014 | Parish et al. | |
| 8,914,919 B1 | 12/2014 | Schubert et al. | |
| 8,936,046 B2 | 1/2015 | Ragner | |
| D723,669 S | 3/2015 | Berardi | |
| 9,022,076 B2 | 5/2015 | Ragner et al. | |
| 9,127,791 B2 | 9/2015 | Ragner | |
| 9,182,057 B2 | 11/2015 | Ragner | |
| 9,279,525 B2 | 3/2016 | Berardi | |
| 9,291,289 B2 | 3/2016 | Queau et al. | |
| 9,367,070 B2 | 6/2016 | Greenwood et al. | |
| 9,371,944 B2 | 6/2016 | Ragner et al. | |
| 9,421,343 B2 | 8/2016 | Berthiaume et al. | |
| 9,421,353 B2 | 8/2016 | Bernard et al. | |
| 9,459,631 B2 | 10/2016 | Lawyer et al. | |
| 9,581,272 B2 | 2/2017 | Berardi | |
| D783,129 S | 4/2017 | Edwards | |
| D783,130 S | 4/2017 | Edwards | |
| 9,765,909 B2 | 9/2017 | Ashcroft | |
| 9,841,127 B2 | 12/2017 | Berardi | |
| 9,844,921 B2 | 12/2017 | Ragner | |
| 9,863,565 B2 | 1/2018 | LaTulippe et al. | |
| 9,874,298 B2 | 1/2018 | Peters | |
| 9,982,808 B2 | 5/2018 | Ragner | |
| 10,174,870 B2 | 1/2019 | Berardi | |
| 10,309,560 B2 | 6/2019 | Ragner et al. | |
| 10,359,131 B2 | 7/2019 | Ragner | |
| 10,386,867 B2 | 8/2019 | Drechsel | |
| 10,393,291 B2 | 8/2019 | Caplan | |
| 10,495,240 B2 | 12/2019 | Dai | |
| 11,898,668 B1 * | 2/2024 | Hsieh | F16L 39/02 |
| 12,188,592 B2 * | 1/2025 | Breeden, III | F16L 29/002 |
| 2003/0098084 A1 | 5/2003 | Ragner et al. | |
| 2004/0244858 A1 | 12/2004 | Jeong | |
| 2006/0070679 A1 | 4/2006 | Ragner | |
| 2007/0208300 A1 | 9/2007 | Pravong et al. | |
| 2009/0078259 A1 | 3/2009 | Kooij et al. | |
| 2009/0229675 A1 | 9/2009 | Hoskisson et al. | |
| 2009/0277525 A1 | 11/2009 | Jourdan | |
| 2013/0113205 A1 | 5/2013 | Berardi | |
| 2013/0180615 A1 | 7/2013 | Ragner et al. | |
| 2013/0213514 A1 | 8/2013 | Berardi | |
| 2014/0130930 A1 | 5/2014 | Ragner | |
| 2014/0150889 A1 | 6/2014 | Ragner | |
| 2014/0230945 A1 | 8/2014 | Ragner et al. | |
| 2014/0332108 A1 | 11/2014 | Forrester et al. | |
| 2015/0007902 A1 | 1/2015 | Ragner | |
| 2015/0041016 A1 | 2/2015 | Ragner | |
| 2015/0129042 A1 | 5/2015 | Ragner | |

(56) References Cited

U.S. PATENT DOCUMENTS

| | | | |
|---|---|---|---|
| 2015/0258323 A1 | 9/2015 | Pravong et al. | |
| 2015/0354731 A1 | 12/2015 | Ragner | |
| 2016/0116087 A1 | 4/2016 | Ragner et al. | |
| 2016/0252199 A1 | 9/2016 | Ragner et al. | |
| 2017/0363236 A1* | 12/2017 | Rose | F16L 21/06 |
| 2018/0045340 A1* | 2/2018 | Berardi | F16L 11/04 |
| 2018/0120866 A1 | 5/2018 | Drechsel | |
| 2018/0213384 A1 | 7/2018 | Youn et al. | |
| 2018/0259096 A1 | 9/2018 | Ragner | |
| 2018/0306353 A1 | 10/2018 | Caplan | |
| 2019/0145553 A1* | 5/2019 | Mezzalira | F16L 11/12 138/118 |
| 2019/0195397 A1 | 6/2019 | Berardi | |
| 2019/0226615 A1* | 7/2019 | Wu | F16L 33/01 |
| 2019/0242502 A1* | 8/2019 | Pan | F16L 11/10 |
| 2019/0285212 A1* | 9/2019 | Righi | F16L 33/02 |
| 2019/0317534 A1 | 10/2019 | Nelson et al. | |
| 2020/0072395 A1* | 3/2020 | Zhang | F16L 33/224 |

FOREIGN PATENT DOCUMENTS

| | | |
|---|---|---|
| CN | 1840949 A | 10/2006 |
| DE | 3129857 A1 | 2/1983 |
| DE | 202012005210 U1 | 6/2012 |
| EP | 161750 B1 | 10/1988 |
| EP | 1847171 B1 | 2/2008 |
| EP | 3258152 A1 | 12/2017 |
| EP | 3258154 A1 | 12/2017 |
| FR | 1255201 A | 3/1961 |
| FR | 2334488 A1 | 7/1977 |
| GB | 933172 A | 8/1963 |
| GB | 2020308 A | 9/1988 |
| GB | 2315702 A | 2/1998 |
| GB | 2458996 A | 10/2009 |
| JP | 200469031 A | 3/2004 |
| WO | 03046427 A1 | 6/2003 |
| WO | 200758327 A1 | 5/2007 |

\* cited by examiner

EXPANDABLE HOSE

RELATED APPLICATIONS

This application is a continuation of U.S. patent application Ser. No. 17/357,848, file Jun. 24, 2021, which claims the benefit of U.S. Provisional Application No. 63/043,759 filed Jun. 24, 2020, U.S. Provisional Application No. 63/071,328 filed Aug. 27, 2020, U.S. Provisional Application No. 63/078,845 filed Sep. 15, 2020, and U.S. Provisional Application No. 63,122,104 filed Dec. 7, 2020, which are hereby incorporated herein by reference.

FIELD OF INVENTION

The present invention relates generally to a hose, and more particularly to a hose for use with a spigot. The hose includes a first end that can be threaded onto a spigot, and a second end that can receive a nozzle, sprinkler, or other suitable device.

BACKGROUND

Hoses can be provided for attachment to a spigot at a home, for example, for watering lawns and gardens. The hoses can be rolled up on a hose reel when not in use, or may be expandable hoses that retract when the water is turned off.

SUMMARY OF INVENTION

According to an aspect, a hose is provided including a first connector assembly including a regulator assembly configured to regulate a flow of fluid through the hose to reduce a pressure of the fluid, and a fluid connector coupled to the regulator assembly for coupling to a spigot, a second connector assembly, and a hose assembly coupled to the first and second connector assemblies, the hose assembly including an inner hose member having first and second ends, an outer hose member having first and second ends, a first hose connector assembly coupled to the first ends of the inner hose member and outer hose member and the first connector assembly, and a second hose connector assembly coupled to the second ends of the inner hose member and outer hose member and the second connector assembly.

The first hose connector assembly may include a tube connector coupled to the first end of the inner hose member, the tube connector including an elongate portion having a bulbous end over which the first end of the inner hose member is received.

The second hose connector assembly may include a tube connector coupled to the second end of the inner hose member and the outer hose member, the tube connector including an elongate portion having a bulbous end over which the second end of the inner and outer hose members are received.

The first hose connector assembly may include a tube connector coupled to the first end of the inner hose member, and a collar surrounding the tube connector and being coupled to the first end of the outer hose member.

The hose may further include a first retainer for holding the inner hose member on the tube connector and a second retainer for holding the outer hose member on the collar.

The collar may include a passage having first portion for accommodating the inner hose member, the first retainer, and an elongate portion of the tube connector, a second portion for accommodating the inner hose member and the elongate portion, and a third portion for accommodating the inner hose member.

The collar may curve outward at an end of the third portion.

The collar may have first and second ends, a plurality of circumferentially spaced fins at the second end, and a groove for receiving the first end of the outer hose member.

The plurality of circumferentially spaced fins may have a curved portion curving upward from the second end to the first end, and an edge at a back of the curved portion that bites into the outer hose member.

The first connector assembly may additionally include a strain relief sleeve coupled to the regulator assembly, the strain relief sleeve including an inner ledge, wherein a flanged portion of the tube connector and a flanged portion of the collar are held between the inner ledge and an end of the regulator assembly.

The regulator assembly may include a body having a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

The first hose connector assembly may include a tube connector coupled to the first end of the inner hose member, the tube connector including a base having a flanged portion, and an elongate portion extending from the base and having a bulbous end over which the first end of the inner hose member is received, and wherein the base is disposed within the second end of the body.

The first connector assembly may additionally include a strain relief sleeve coupled to the second end of the body, the strain relief sleeve including an inner ledge, wherein the flanged portion of the tube connector is held between the inner ledge and the second end of the body.

The first hose connector assembly may include a first tube connector coupled to the first end of the inner hose member and the second hose connector assembly may include a second tube connector coupled to the second end of the inner hose member, and wherein the second tube connector has a cross-sectional area that is smaller than a cross-sectional area of the first tube connector.

According to another aspect, a hose may be provided that includes an inner hose member having first and second ends, an outer hose member having first and second ends and surrounding the inner hose member, a hose connector assembly coupled to the first ends of the inner hose member and outer hose member, a regulator assembly coupled to the hose connector assembly and configured to regulate a flow of fluid through the hose to reduce a pressure of the fluid, and a fluid connector coupled to the regulator assembly for coupling a spigot.

The regulator assembly may include a body having a first end coupled to the fluid connector and a second end coupled to the hose connector assembly, a valve stem disposed in the body, and a valve seat disposed in the body, wherein the valve stem is biased in an open position and movable to a closed position against the valve seat blocking flow through the regulator assembly.

The hose connector assembly may include a tube connector coupled to the first end of the inner hose member, and a collar surrounding the tube connector and being coupled to the first end of the outer hose member.

The tube connector may include an elongate portion having a bulbous end over which the first end of the inner hose member is received.

The hose may further include a first retainer for holding the inner hose member on the tube connector and a second retainer for holding the outer hose member on the collar.

According to another aspect, a hose may be provided that includes an inner hose member having first and second ends, an outer hose member having first and second ends and surrounding the inner hose member, a hose connector assembly coupled to the first ends of the inner hose member and outer hose member, the hose connector assembly including a tube connector having a base with a flanged portion and an elongate portion extending from the base and having a bulbous end over which the first end of the inner hose member is received, a regulator assembly coupled to the hose connector assembly and configured to regulate a flow of fluid through the hose to reduce a pressure of the fluid, the regulator assembly including a body having a first end and a second end coupled to the hose connector assembly, a valve stem disposed in the body, and a valve seat disposed in the body, a fluid connector coupled to the first end of the body for coupling a spigot, and a strain relief sleeve coupled to the second end of the body, the strain relief sleeve including an inner ledge, wherein the flanged portion of the tube connector is held between the inner ledge and the second end of the body.

The foregoing and other features of the application are described below with reference to the drawings.

DETAILED DESCRIPTION

Figure 1:
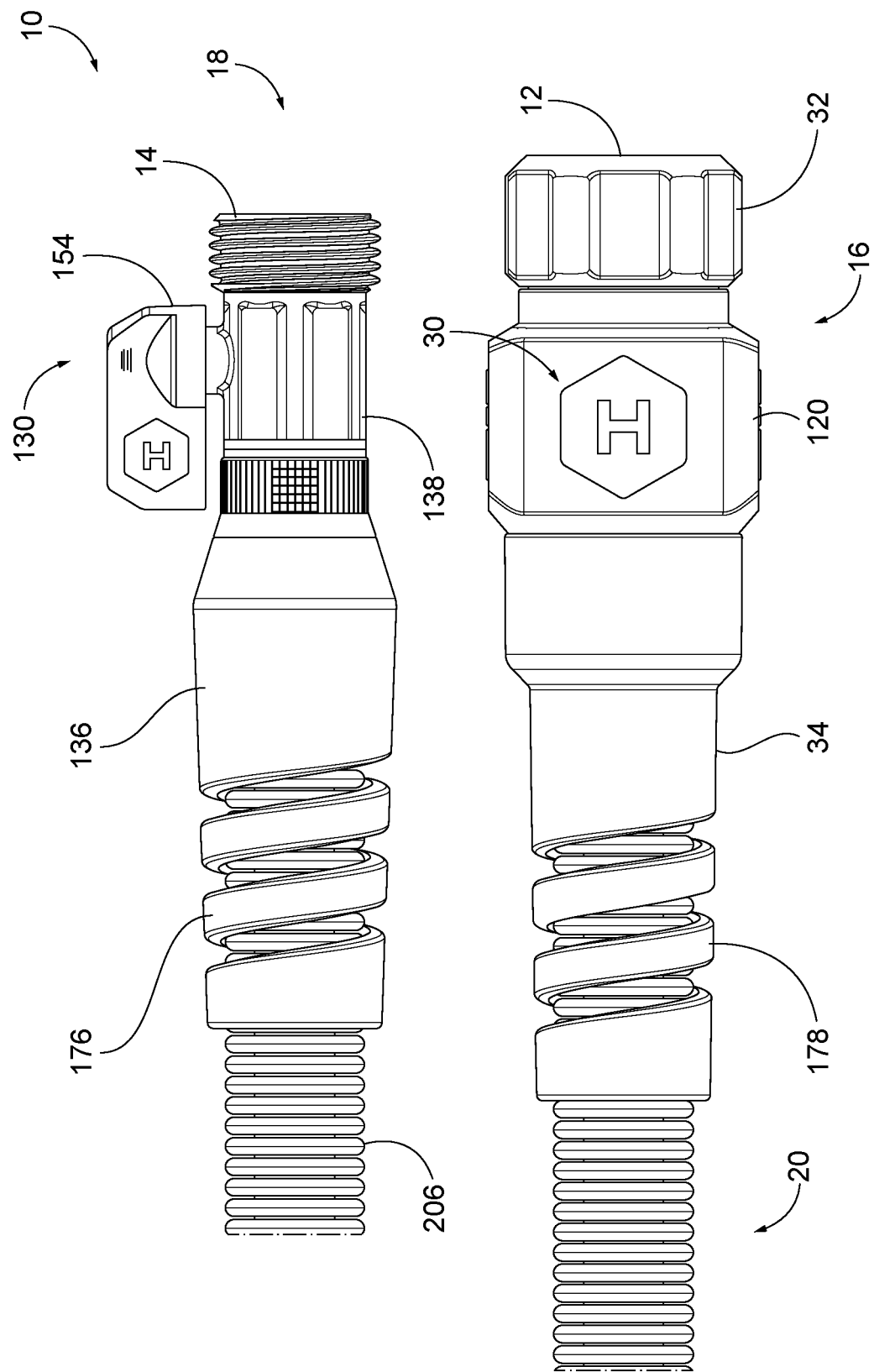
FIG. 1 is a side view of an exemplary expandable hose.

Turning initially to FIG. 1, an expandable hose is shown generally at reference numeral 10. The expandable hose 10 can be automatically expanded upon the introduction of fluid pressure and automatically contracted when there is no fluid pressure. The expandable hose has first and second ends 12 and 14, a first connector assembly 16 at the first end 12, a second connector assembly 18 at the second end 14, and a hose assembly 20 connected to the first and second connector assemblies 16 and 18. The first connector assembly 16 is configured to couple to a spigot and the second connector assembly 18 is configured to couple to a nozzle, spray wand, sprinkler, water toy, or other suitable water delivery device, or coupled to a vehicle or other powered component.

Figure 2:
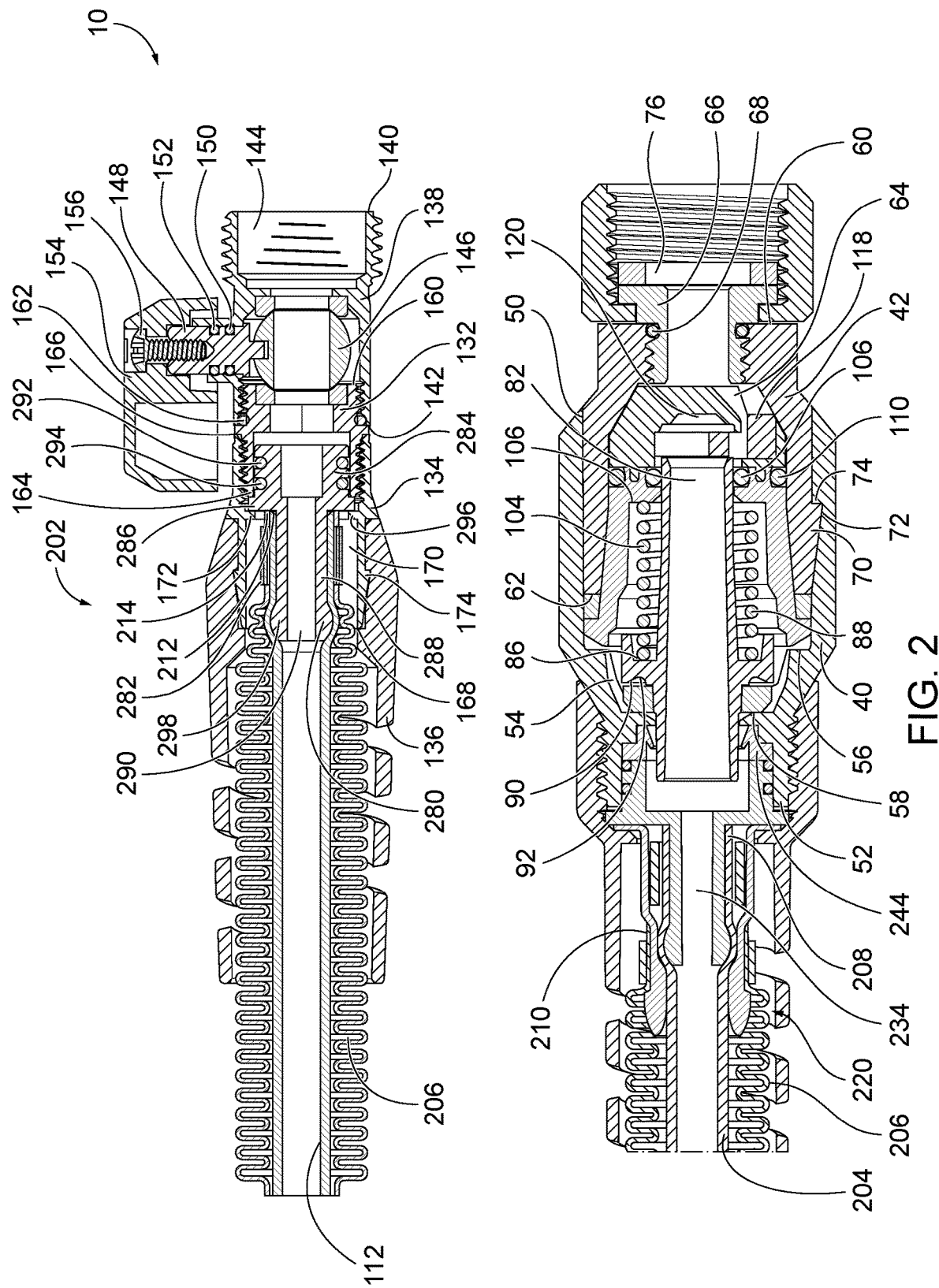
FIG. 2 is a cross-sectional view of the expandable hose.
Figure 3:
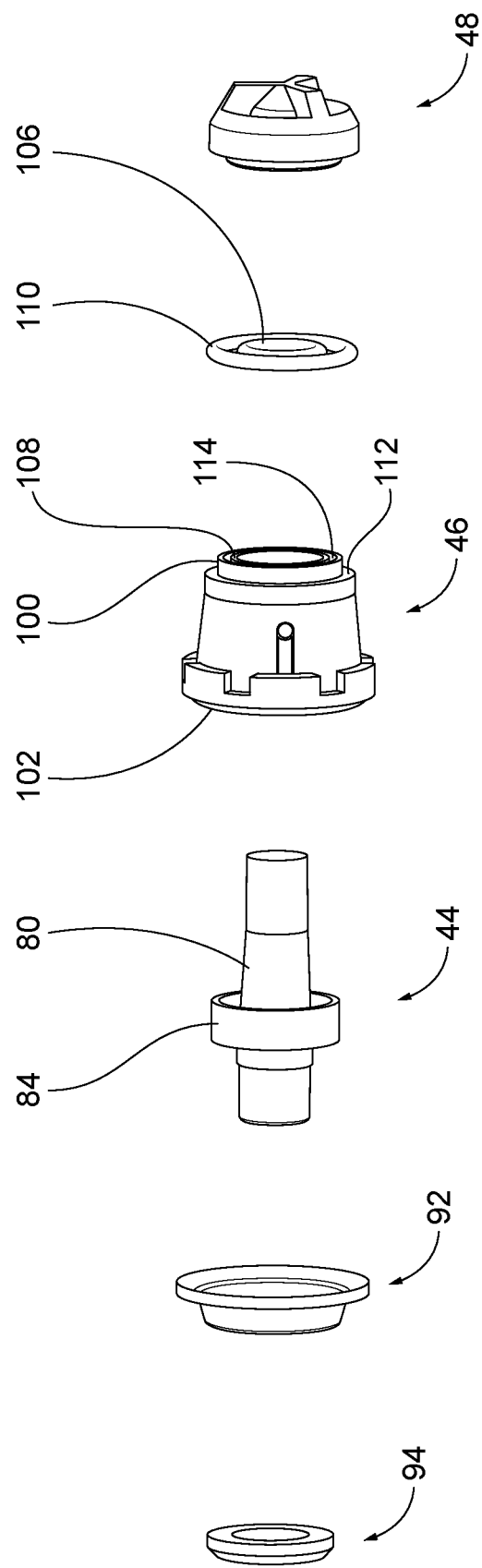
FIG. 3 is an exploded view of components of a regulator assembly of the expandable hose.

Referring additionally to FIGS. 2 and 3, the first connector assembly 16 will be described in detail. The first connector assembly 16 includes a regulator assembly 30, a spigot connector 32 attached to one end of the regulator assembly 30, and a strain relief sleeve 34 that along with the hose assembly 20 is attached to the other end of the regulator assembly 30.

The regulator assembly 30 is provided to reduce a pressure of fluid flowing through the hose 10. For example, fluid pressure in a spigot may be as high as one hundred forty pounds per square inch (PSI), but such high pressure tends to cause traditional expandable hoses to burst and is unnecessary for the operation of lawn and garden accessories like nozzles and sprinklers. The regulator assembly 30 is provided to reduce the pressure of the fluid entering the hose from the spigot to a predetermined pressure, for example between sixty and eighty PSI to prevent the water pressure from causing the hose 10 to burst.

The regulator assembly 30 includes a body formed by a first or outer housing 40 and a second or inner housing 42, a valve stem 44, a valve cup 46, and a valve seat 48. The components may be made of a suitable material, such as a suitable polymer, such as acrylonitrile butadiene styrene. The first housing has a first end 50, a second end 52 with an attachment mechanism for attaching to the strain relief sleeve 34, for example by a threaded connection as shown, press fit, adhesive, etc., and a passage 54 extending therebetween. First and second inner ledges 56 and 58 are defined in the passage 54.

The second housing 42 has a first end 60 that connects to the spigot connector 32, a second end 62 received in the passage 54, and a passage 64 extending therebetween. The first end 60 connects to the spigot connector 32 in a suitable manner, such as by an intervening member 66 received in the spigot connector 32 and threadably connected to the first end 60 as shown, by a press fit, etc. The intervening member 66 may be sealed to the second housing 42 in a suitable manner, such as by a suitable seal, such as O-ring 68, and a gasket 76 may be provided for sealing to a spigot. The second end 62 connects to the first housing 40 in a suitable manner. For example, the second housing 42 can include a plurality of wedges 70 circumferentially spaced on an outer surface thereof near the first end 60, where each wedge 70 includes a ledge 72. The wedges 70 are received in corresponding circumferentially spaced niches 74 in the passage 54 and the ledges 72 engage the niches 74 to secure the second housing 42 to the first housing 40.

Turning now to FIG. 3, the valve stem 44 has a body 80 with a passage 82 extending therethrough and a flanged portion 84 projecting outward from the body 80. A first side 86 of the flanged portion 84 serves as a spring seat for a spring 88, and a second side 90 contacts a flexible diaphragm 92. The flexible diaphragm 92 is disposed between the second side 90 and a gasket 94 and between the first inner ledge 56 and the valve cup 46. The gasket 94 is coupled to or otherwise moves with the valve stem 44 and seals against the second inner ledge 58 when the valve stem 44 is in an open position. The valve stem 44 is biased in the open position by the spring 88 and movable against the biasing force by fluid pressure to adjust flow through regulator assembly 30.

Turning now to the valve cup 46, the valve cup 46 is disposed in the passage 54 and has a first end 100, a second end 102 held between the first inner ledge 56 and the second end 62 of the second housing 42, and a passage 104 extending therebetween. An inner ledge 106 is defined in the passage 104 and serves as a spring seat for the other end of the spring 88, and the body 80 of the valve stem 44 extends through the passage 104 and out of the second end 102 of the valve cup 46. The valve stem 44 is sealed to the first end 100 of the value cup 46 by a suitable seal, such as O-ring 106 disposed in a seal groove 108, and the valve cup 46 is sealed to an inner surface of the second housing 42 by a suitable seal, such as O-ring 110 disposed in a seal groove 112.

Between the seal grooves 108 and 112 is an annular channel 114 for receiving a corresponding annular projection 116 of the valve seat 48. When the projection 116 is in the annular channel 114, the valve seat 48 seals against the O-rings 106 and 110 and is held between the valve cup 46 and an inner surface of the second housing 42 in the passage 64. The valve seat 48 includes one or more passages 118 therethrough for fluid to flow, and a seat 120 on an underside thereof that is contacted by the valve stem 44 in a closed position to block flow through the regulator assembly 30, for example when a high back pressure urges the stem 44 in the closed position. When the pressure reduces, the force of the spring 88 will move the valve stem 44 away from the seat 120. The stem 44 is movable between the open and closed positions to adjust the flow based on the pressure of the fluid passing through the regulator.

With continued reference to FIG. 2, the second connector assembly 18 will be described in detail. The second connector assembly 18 includes a ball valve assembly 130, a spacer 132 connected to the ball valve assembly 130, a sleeve connector 134 connected to the spacer 132, and a strain relief sleeve 136 connected to sleeve connector 134. The ball valve assembly 130 includes a body 138 with a first end 140 for connecting to a nozzle, sprinkler, etc., for example by a threaded connection, a second end 142 for connecting to the spacer 132, and a passage 144 extending between the first and second ends 140 and 142. Disposed in the passage 144 is a ball valve 146 movable from a closed position blocking flow through the passage 144 to an open position allowing flow through the passage 144, and a number of positions therebetween. The ball valve 146 is rotated by a stem 148 sealed to the body 138 by suitable seals, such as O-ring 150 and 152, and the stem 148 is rotated by a lever 154 coupled to the stem 148 in a suitable manner, such as by a fastener 156.

The spacer 132 has a first end 160 connected to the second end 142 of the body 138 in a suitable manner, such as by a threaded connection, and sealed thereto by a suitable seal, such as O-ring 162, and a second end 164 connected to a first end 166 of the sleeve connector 134 in a suitable manner, such as by a threaded connection. It will be appreciated that in an embodiment, the sleeve connector 134 may be provided with threads that mate with the threads at the second end 142 of the body 138 and the spacer 132 may be eliminated.

The sleeve connector 134 has the first end 166, a second end 168 connected to the strain relief sleeve 136, and a passage 170 extending between the first and second ends 166 and 168. A shoulder 172 is defined in the passage 170 for retaining a tube connector of the hose assembly 20 as will be described below. The second end 168 may be connected to the strain relief sleeve 136 in a suitable manner, such as by one or more barbs 174 as shown, by a threaded connection, etc. The strain relief sleeve 136 and the strain relief sleeve 34 may be made of a suitable material, such as nylon, and each include a coiled portion 176, 178 allowing the sleeves to bend with bending of the hose to reduce or eliminate rupturing of the hose, and to expand/retract with movement of the hose.

Figure 4:
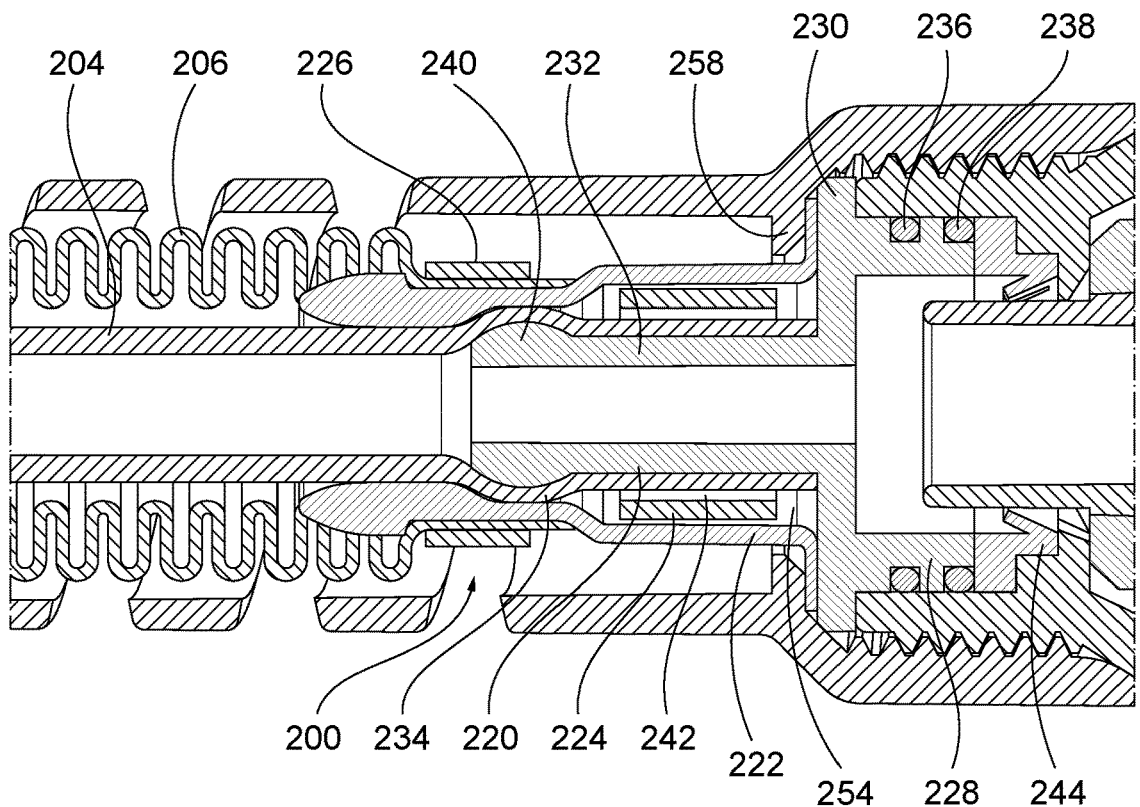
FIG. 4 is a cross-sectional view of a portion of the expandable hose showing an inner tube and outer jacket in a retracted position.
Figure 5:
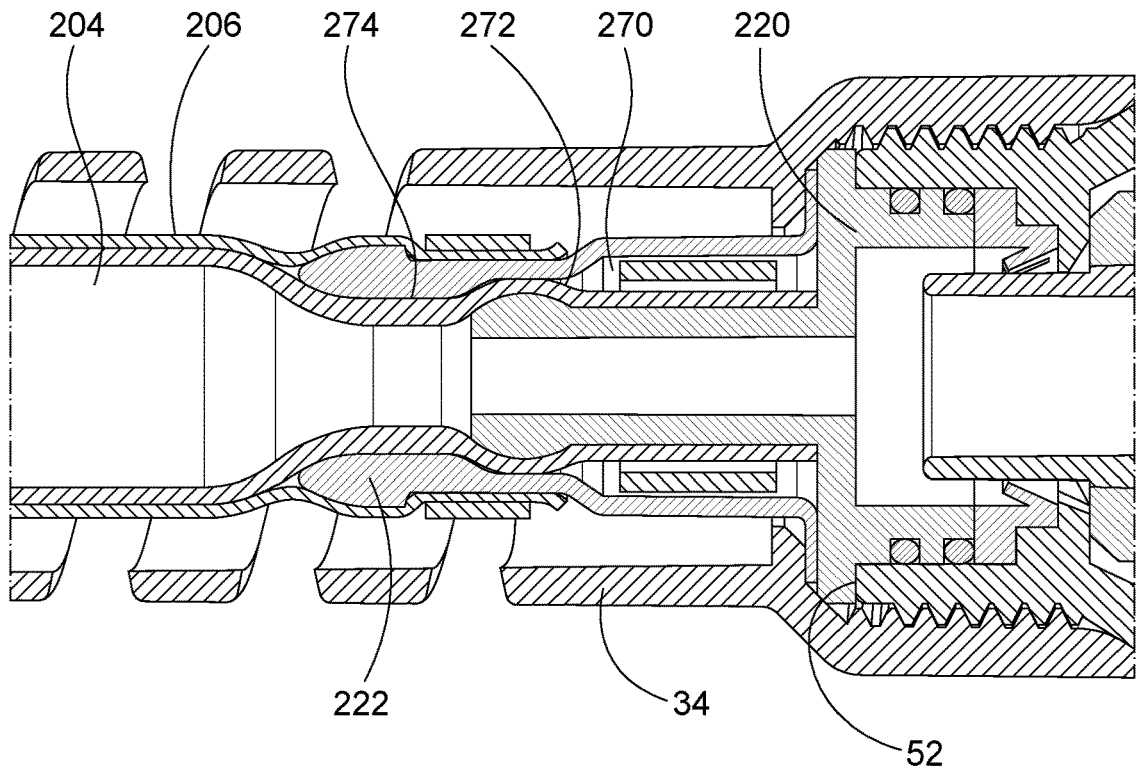
FIG. 5 is a cross-sectional view of a portion of the expandable hose showing the inner tube and outer jacket in an expanded position.

Referring additionally to FIGS. 4 and 5, the hose assembly 20 will be described in detail. The hose assembly 20 includes a first hose connector assembly 200, a second hose connector assembly 202, an inner hose member 204, and an outer hose member 206 surrounding the inner tube 204. The inner hose member 204 or inner tube and the outer hose member 206 or outer jacket are connected to the first and second hose connector assemblies 200 and 202 at respective first ends 208 and 210 and respective second ends 212 and 214. As will be described in more detail below, because the most strain is applied to the inner tube 204 at the first end, the inner tube 204 and outer jacket 206 are not connected to one another at their first ends 208 and 210 to reduce wear on the inner tube 204. Although not shown, it will be appreciated that the inner tube and outer jacket may be coupled to the second hose connector assembly 202 in a similar manner as the first hose connector assembly 200.

The inner tube 204 is made of a suitable flexible fluid carrying material such as, for example, an elastic material, such as rubber, to permit the inner tube 204 to expand when a pressurized fluid is introduced into the inner tube 204. It will be appreciated that other suitable materials having elastic properties can also be used. As the fluid flow increases, the inner tube 204 expands both laterally and longitudinally as shown in FIG. 5. The expansion of the inner tube 204, both laterally and longitudinally, results in a decrease in the wall thickness of the inner tube 204 and an increase in the diameter of the inner tube 204 thus increasing the volume of fluid that can flow through the inner tube 204. The outer jacket 206 may be made of suitable fibers woven to allow the jacket to expand and contract, such as nylon or polyester fibers, or may be made of another suitable material. The outer jacket 206 may have a greater longitudinal length than the inner tube 204, and may include peaks and valleys when there is no fluid flow through the hose.

Turning now to the first hose connector assembly 200 in detail, the assembly includes a tube connector 220, a collar 222, a first retainer 224, and a second retainer 226. The tube connector 220 may be made of a suitable material, such as nylon, and includes a base 228 having a flanged portion 230, an elongate portion 232 extending from the base 228, and a passage 234 extending through the base 228 and elongate portion 232. The base 228 is disposed within the second end 52 of the outer housing 40 and sealed thereto by one or more suitable seals, such as O-rings 236 and 238, and the flanged portion 230 is held between second end 52 of the outer housing 40 and an inner surface of the strain relief sleeve 34 to couple the tube connector 220 to the first connector assembly 16. The elongate portion 232 receives the first end 208 of the inner tube 204 and includes a bulbous or radiused end 240 over which the first end of the inner tube is received providing a rounded area to prevent rupture/tearing of the inner tube 204 when bent. The first end 208 of the inner tube 204 is held on the elongate portion 232 by the first retainer 224, which may be a suitable clamp or the like. A sleeve 242, which may be a gasket, tape, mesh, or the like, may be provided between the inner tube 204 and the retainer 224 to provide protection to the inner tube 204 at the connection point. A spacer 244 may be provided between the tube connector 220 and the ledge of the outer housing 40 or the tube connector 220 may be sized larger.

Figure 6:
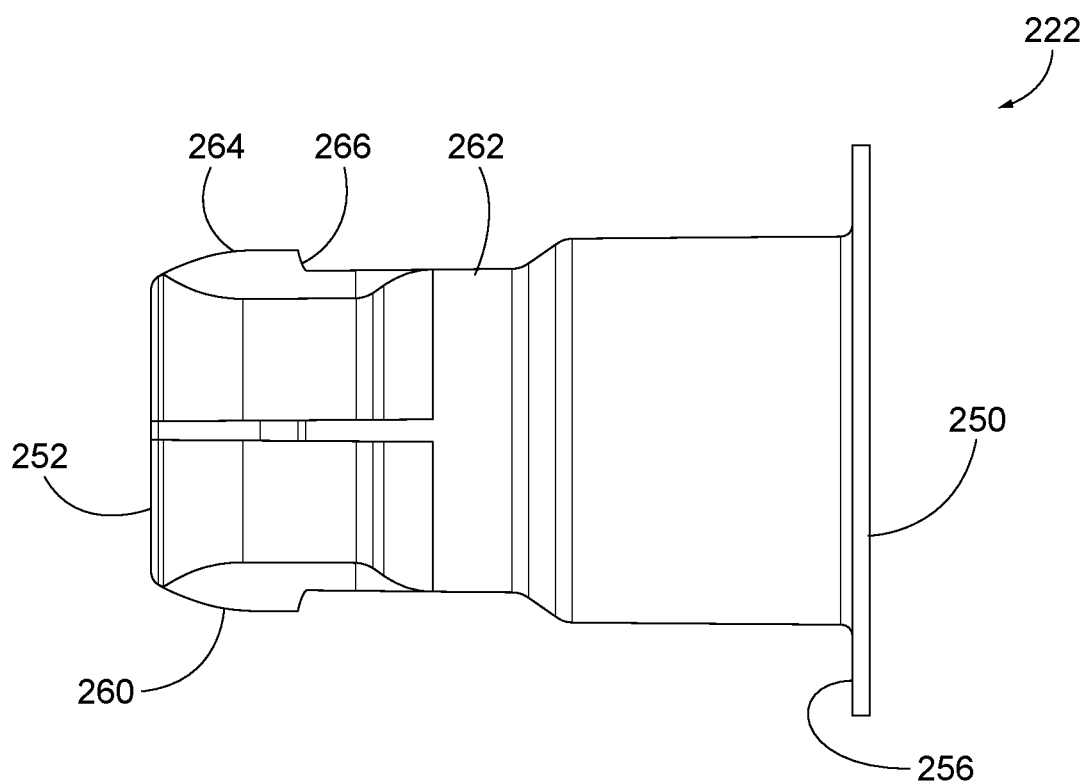
FIG. 6 is a side view of an exemplary collar.
Figure 7:
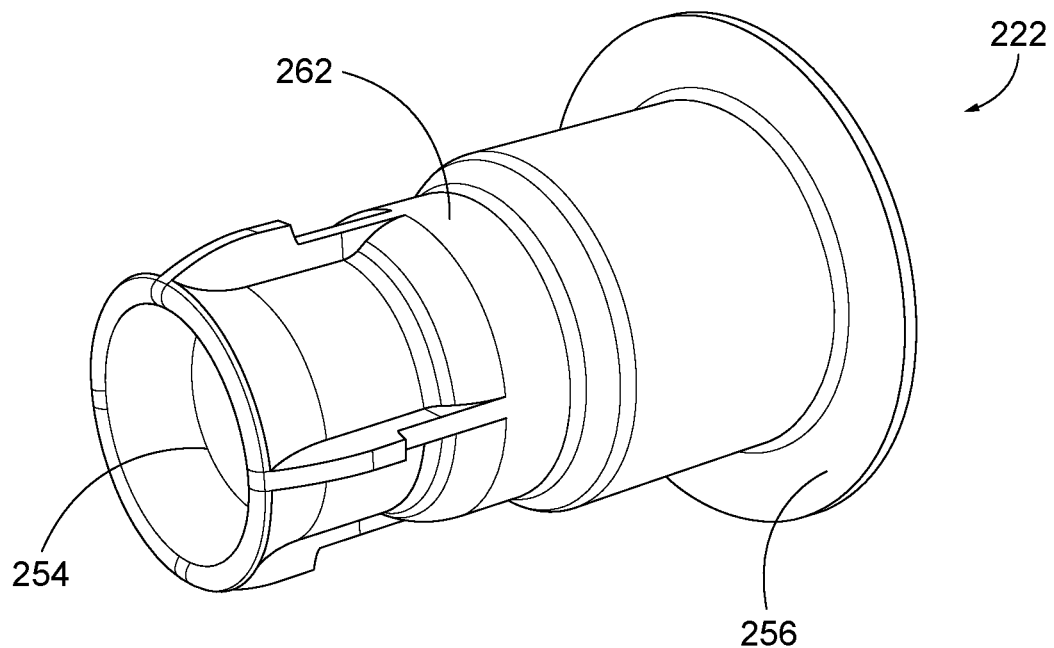
FIG. 7 is a perspective view of the collar.
Figure 8:
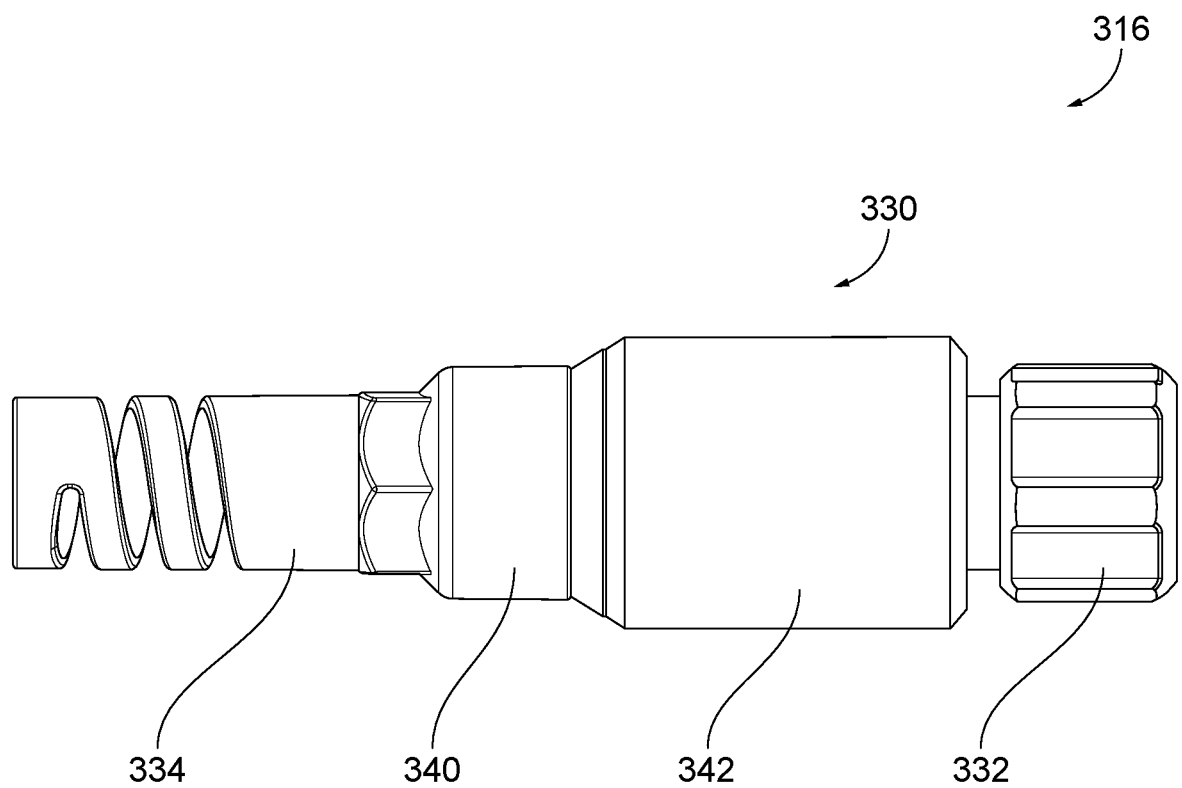
FIG. 8 is a side view of a connector assembly of another exemplary expandable hose.
Figure 9:
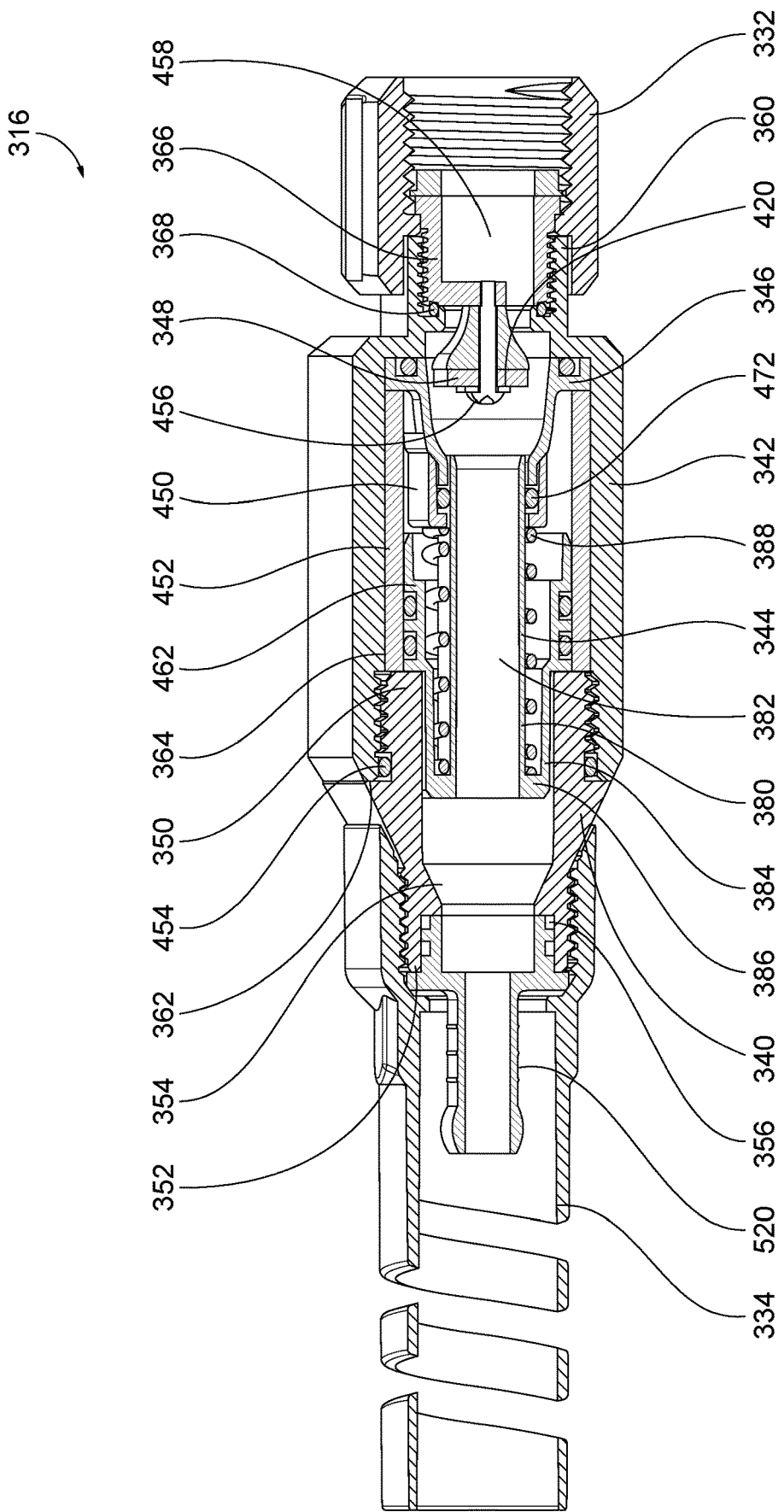
FIG. 9 is a cross-sectional view of the connector assembly in an open position.
Figure 10:
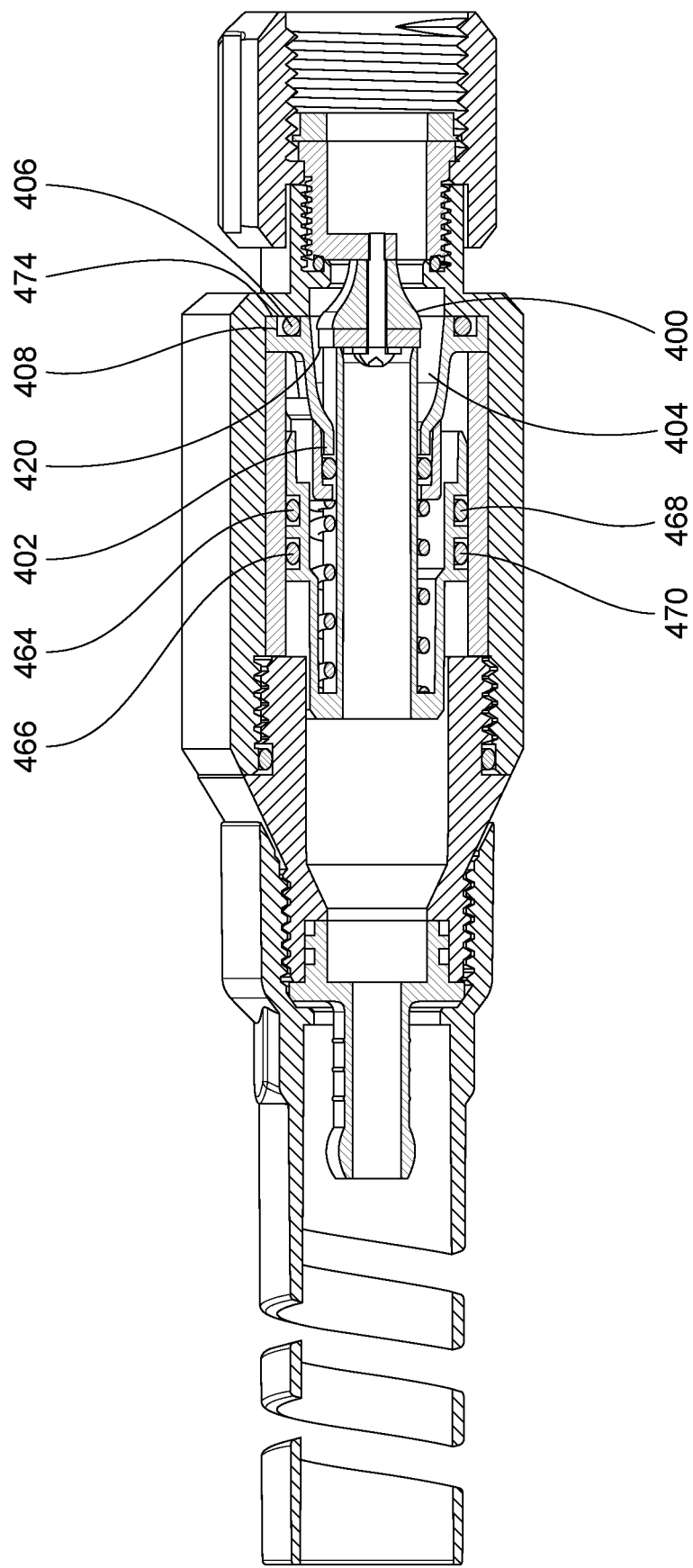
FIG. 10 is a cross-sectional view of the connector assembly in a closed position.

Turning additionally to FIGS. 6 and 7, the collar 222 surrounds the first end 208 of the inner tube 204 and the elongate portion 232 and extends past the second end of the tube connector 220 to provide a connection area for the outer jacket 206 to prevent the outer jacket 206 from wearing against the inner tube 204. The collar 222 has first and second ends 250 and 252, a passage 254 extending therebetween, a flanged portion 256 at the first end 250 held between the flanged portion 230 of the tube connector 220 and an inner ledge 258 of the strain relief sleeve 34, a plurality of circumferentially spaced fins 260 at the second end 252, and a groove 262 for receiving the first end 210 of the jacket 206 and the second retainer 226 to couple the jacket 206 to the collar 222. The plurality of circumferentially spaced fins 260 have a curved portion 264 curving upward from the second end 252 to the first end 250, and an edge 266 at a back of the curved portion 264 that bites into the outer jacket 206.

The passage 254 includes a first portion 270 having a first diameter for accommodating the inner tube 204, first retainer 224, and elongate portion 232, a second portion 272 having a second diameter less than the first diameter for accommodating the inner tube 204 and radiused end 240, and a third portion 274 having a third diameter less than the second diameter for accommodating the inner tube 204. The collar 222 curves outward at the second end 252 such that the third portion 274 is also curved outward providing a smooth area for the inner tube 204 to contact when expanded to prevent the collar 222 from biting into the inner tube 204.

Turning now to the second hose connector assembly 202, the assembly includes a tube connector 280 and a first retainer 282. The tube connector 280 may be made of a suitable material, such as nylon, and includes a base 284 having a flanged portion 286, an elongate portion 288 extending from the base 284, and a passage 290 extending through the base 284 and elongate portion 288. The base 284 is disposed within the spacer 132 and sealed thereto by one or more suitable seals, such as O-rings 292 and 294, and the flanged portion 286 is held between the second end 164 of the spacer 132 and an inner ledge 296 of the sleeve connector 134 to couple the tube connector 280 to the second connector assembly 18. The elongate portion 288 receives the second end 212 of the inner tube 204 and includes a bulbous or radiused end 298 over which the second end of the inner tube is received to prevent rupture/tearing of the inner tube 204 when bent. The second end 212 of the inner tube 204 is held on the elongate portion 288 by the first retainer 282, which may be a suitable clamp or the like. A sleeve (not shown), which may be a gasket, tape, mesh, or the like, may be provided between the inner tube 204 and the retainer 282 to provide protection to the inner tube 204 at the connection point. The tube connector 280 may be sized proportionally to the tube connector 220 for retraction. For example, the tube connector 280 may have a cross-sectional area that is smaller than a cross-sectional area of the tube connector 220 to prevent the hose from retracting under flow. In an embodiment, the cross-sectional area of the tube connector 280 is about thirty percent less than the cross-sectional area of the tube connector 220.

Referring again to FIGS. 4 and 5, the operation of the hose 10 will be described. The spigot connector 32 can be attached to a spigot by threading the connector onto the spigot, while a nozzle or the like in an off position is attached to the second connector assembly 18 and/or the ball valve assembly 130 is placed in a closed position. A user can then turn on the spigot and fluid, such as water flows under pressure into the regulator assembly 30, where the pressure of the water can be regulated. The water flows through the one or more passages 118 in the valve seat 48 into the passage of the valve stem 44. The water then flows through the passage 234 in the tube connector 220 and into the inner tube 204, causing the inner tube 204 to expand laterally and longitudinally, which causes the outer jacket 206 to expand longitudinally. The user can then open the ball valve assembly 130 allowing water to be delivered from the hose. During use, the valve stem 44 can move against the biasing force of the spring 88 to adjust the flow through the regulator assembly 30, and can seat against the valve seat 48, for example when a high back pressure urges the stem 44 in the closed position.

Turning now to FIGS. 8-11, an exemplary embodiment of the first connector assembly is shown at 316. The first connector assembly 316 is substantially the same as the above-referenced first connector assembly 16, and consequently the same reference numerals but indexed by 300 are used to denote structures corresponding to similar structures in the assemblies. In addition, the foregoing description of the first connector assembly 16 is equally applicable to the first connector assembly 316 except as noted below.

The first connector assembly 316 includes a regulator assembly 330, a spigot connector 332 attached to one end of the regulator assembly 330, and a strain relief sleeve 334 that along with a hose assembly is attached to the other end of the regulator assembly 330.

The regulator assembly 330 includes a first housing 340, a second housing 342, a valve stem 344, a valve cup 346, a valve seat 348, a spring seat 450, and a sleeve 452. The first housing 340 has a first end 350 with an attachment mechanism for attaching to a first end of the second housing 342, for example by a threaded connection as shown, press fit, adhesive, etc., a second end 352 with an attachment mechanism for attaching to the strain relief sleeve 334, for example by a threaded connection as shown, press fit, adhesive, etc., and a passage 354 extending therebetween. An inner ledge 356 is defined in the passage 354 to be abutted by a tube connector 520.

Figure 11:
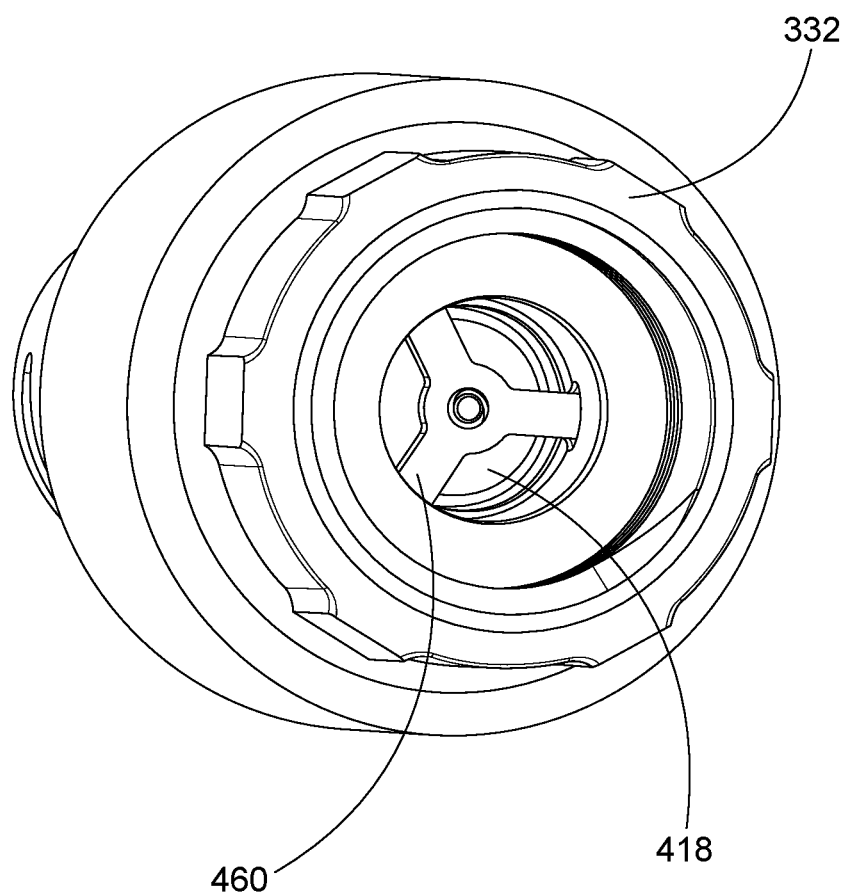
FIG. 11 is a perspective end view of the connection assembly.

The second housing 342 has the first end 360 that connects to the spigot connector 332, a second end 362 that is sealed to the first housing 340 in a suitable manner, such as by a suitable seal, such as O-ring 454, and a passage 364 extending therebetween. The first end 360 connects to the spigot connector 332 in a suitable manner, such as by an intervening member 366 received in the spigot connector 332 and threadably connected to the first end 360 as shown, by a press fit, etc. The intervening member 366 may be sealed to the second housing 342 in a suitable manner, such as by a suitable seal, such as O-ring 368, and may be coupled to the valve seat 348 in a suitable manner, such as by fastener 456. As best shown in FIG. 11, the intervening member 366 has a passage 458 with a plurality of spaced flow dividers 460 forming one or more passages 418 through which the fluid flows from the spigot.

Turning now to the valve stem 344, the valve stem 344 has a body 380 with a passage 382 extending therethrough and a flanged portion 384 projecting outward from the body 380. A first side 386 of the flanged portion 384 serves as a spring seat for a spring 388. The flange portion 384 also includes an annular outwardly extending portion 462 defining a ledge that abuts the second end 352 of the first housing 340 in an open position. The outwardly extending portion 462 includes one or more seal grooves 464 and 466 for receiving a corresponding seal, such as O-rings 468 and 470 respectively, which move with the valve stem 344 to maintain a seal between the valve stem 344 and the sleeve 452. It will be appreciated that in an embodiment the sleeve 452 may be eliminated and the valve stem 344 seal against the second housing 342. The valve stem 344 is biased in the open position shown in FIG. 9 by the spring 388 and movable against the biasing force by fluid pressure to adjust flow through regulator assembly 330 to the closed position shown in FIG. 10. The spring seat abuts the valve cup 346 and serves as a seat for the other end of the spring 388. The valve stem 344 moves within and is sealed against the spring seat 450 by a suitable seal, such as O-ring 472.

Turning now to the valve cup 346, the valve cup 346 is disposed in the passage 364 and has a first end 400 abutting an inner ledge 474 of the second housing 342, a second end 402 surrounding the body 380 of the valve stem 344, and a passage 404 extending therebetween. The valve stem 344 is sealed to the inner ledge 474 by a suitable seal, such as O-ring 406 disposed in a seal groove 408. A portion of the valve seat 348 is disposed in the passage 404, and the valve seat 348 curves inward toward the intervening member 366.

The valve seat 348 includes a seat 420 on an underside thereof that is contacted by the valve stem 344 in a closed position to block flow through the regulator assembly 330, for example when a high back pressure urges the stem 344 in the closed position. When the pressure reduces, the force of the spring 388 will move the valve stem 344 away from the seat 420. The stem 344 is movable between the open and closed positions to adjust the flow based on the pressure of the fluid passing through the regulator.

Figure 12:
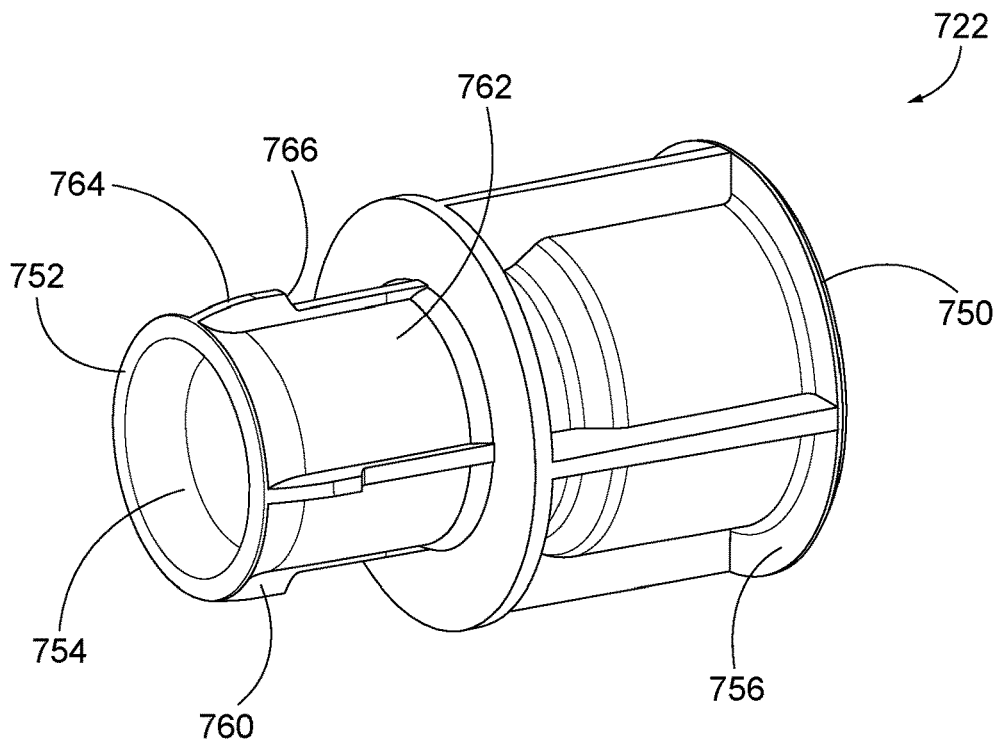
FIG. 12 is a perspective view of another exemplary collar.
Figure 13:
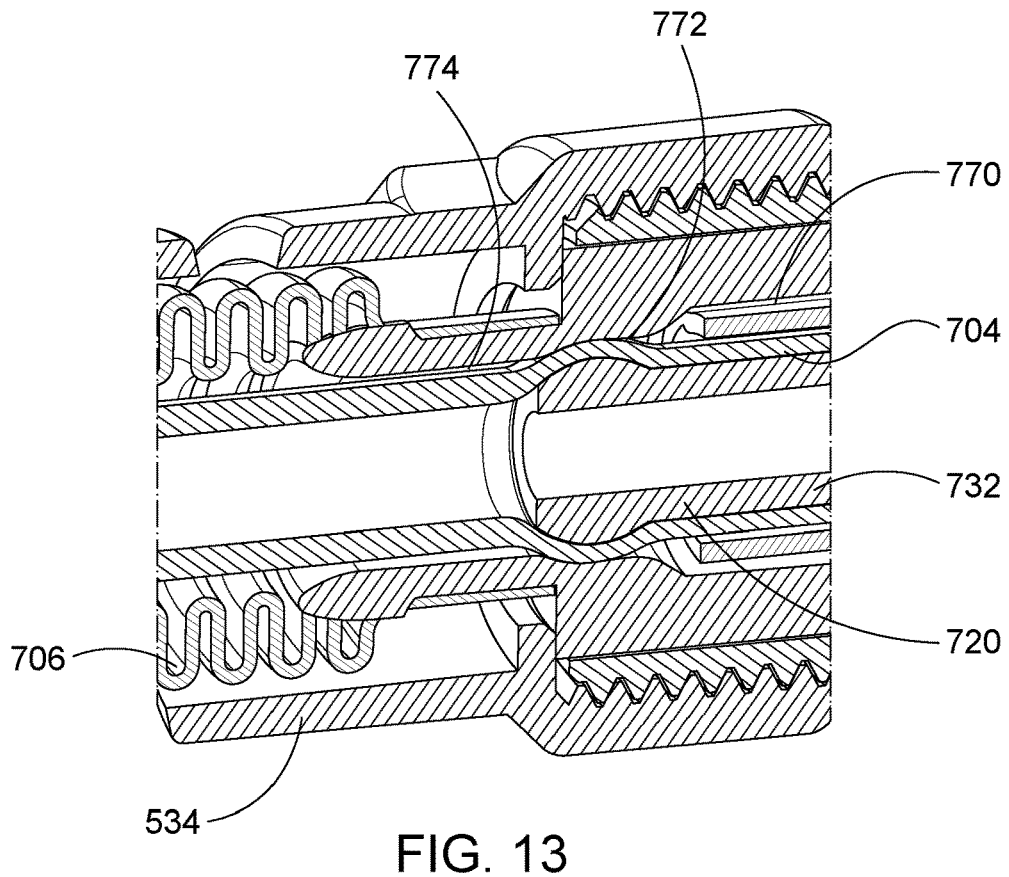
FIG. 13 is a cross-sectional view of a portion of the expandable hose showing the collar of FIG. 12.

Turning now to FIGS. 12 and 13, an exemplary embodiment of the collar is shown at 722. The collar 722 is substantially the same as the above-referenced collar 222, and consequently the same reference numerals but indexed by 500 are used to denote structures corresponding to similar structures in the collars. In addition, the foregoing description of the collar 222 is equally applicable to the collar 722 except as noted below.

The collar 722 surrounds a first end of an inner tube 704 and an elongate portion 732 of a tube connector 720 to provide a connection area for an outer jacket 706 to prevent the outer jacket 706 from wearing against the inner tube 704. The collar 722 has first and second ends 750 and 752, a passage 754 extending therebetween, a flanged portion 756 held between a flanged portion of the tube connector 720 and an inner ledge 758 of a strain relief sleeve 534, a plurality of circumferentially spaced fins 760 at the second end 752, and a groove 762 for receiving a first end 710 of the jacket 706 and a second retainer (not shown) to couple the jacket 706 to the collar 722. The plurality of circumferentially spaced fins 760 have a curved portion 764 curving upward from the second end 752 to the first end 750, and an edge 766 at a back of the curved portion 764 that bites into the outer jacket 706.

The passage 754 includes a first portion 770 having a first diameter for accommodating the inner tube 704, a first retainer 724, and the elongate portion 732, a second portion 772 having a second diameter less than the first diameter for accommodating the inner tube 704 and the radiused end 740 of the elongate portion 732, and a third portion 774 having a third diameter less than the second diameter for accommodating the inner tube 704. The collar 722 curves outward at the second end 752 such that the third portion 774 is also curved outward providing a smooth area for the inner tube 704 to contact when expanded to prevent the collar 722 from biting into the inner tube 704.

Figure 14:
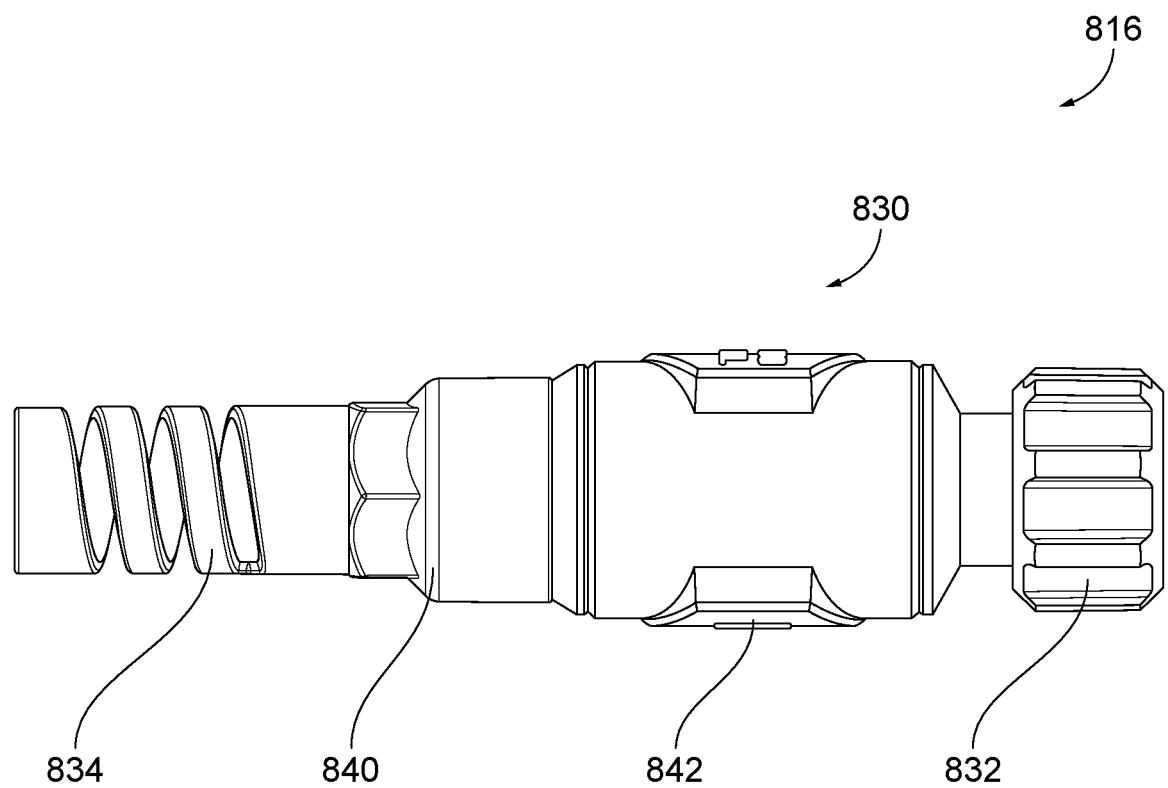
FIG. 14 is a side view of a connector assembly of still another exemplary expandable hose.
Figure 15:
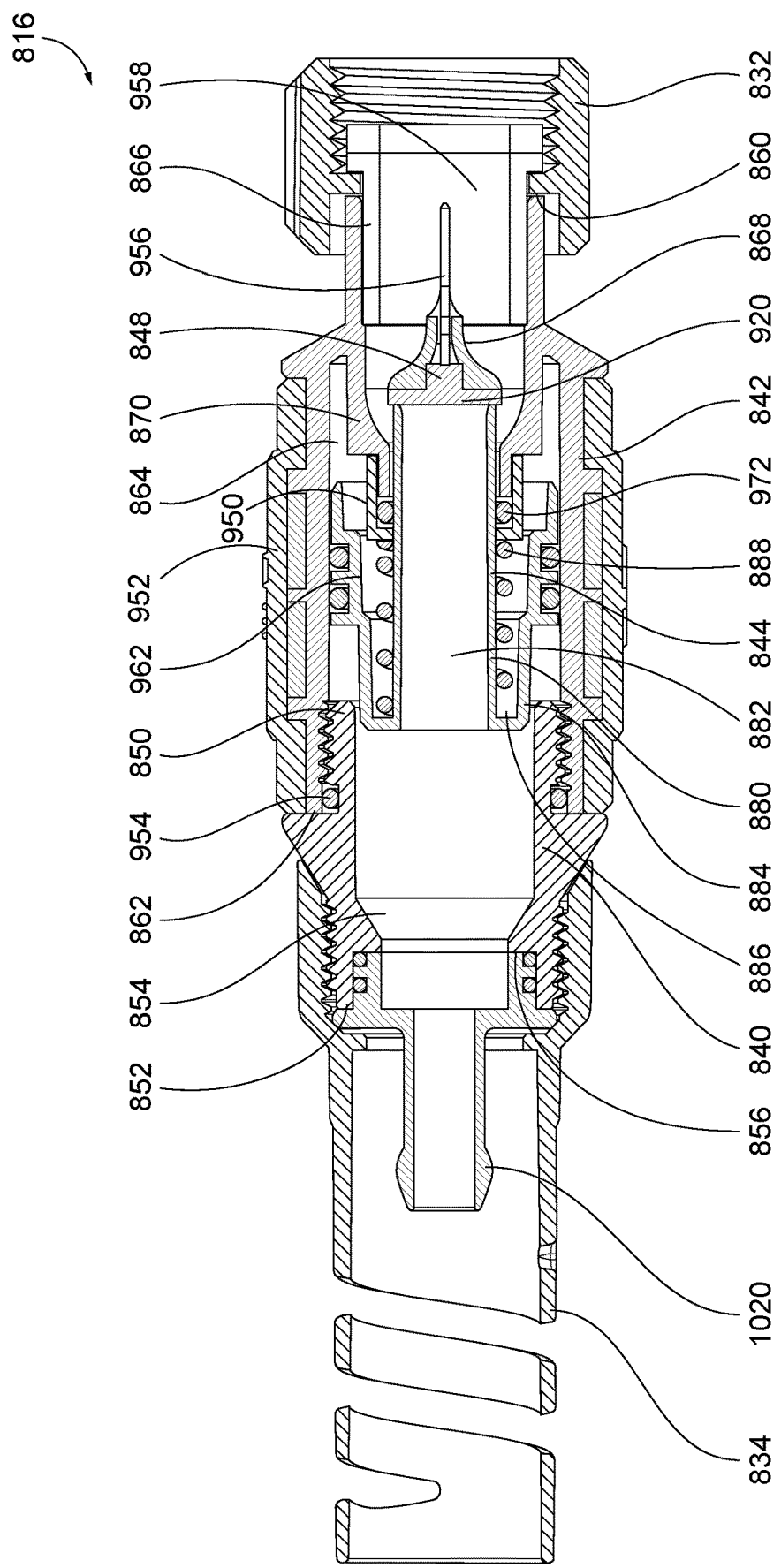
FIG. 15 is a cross-sectional view of the connector assembly in a closed position.
Figure 16:
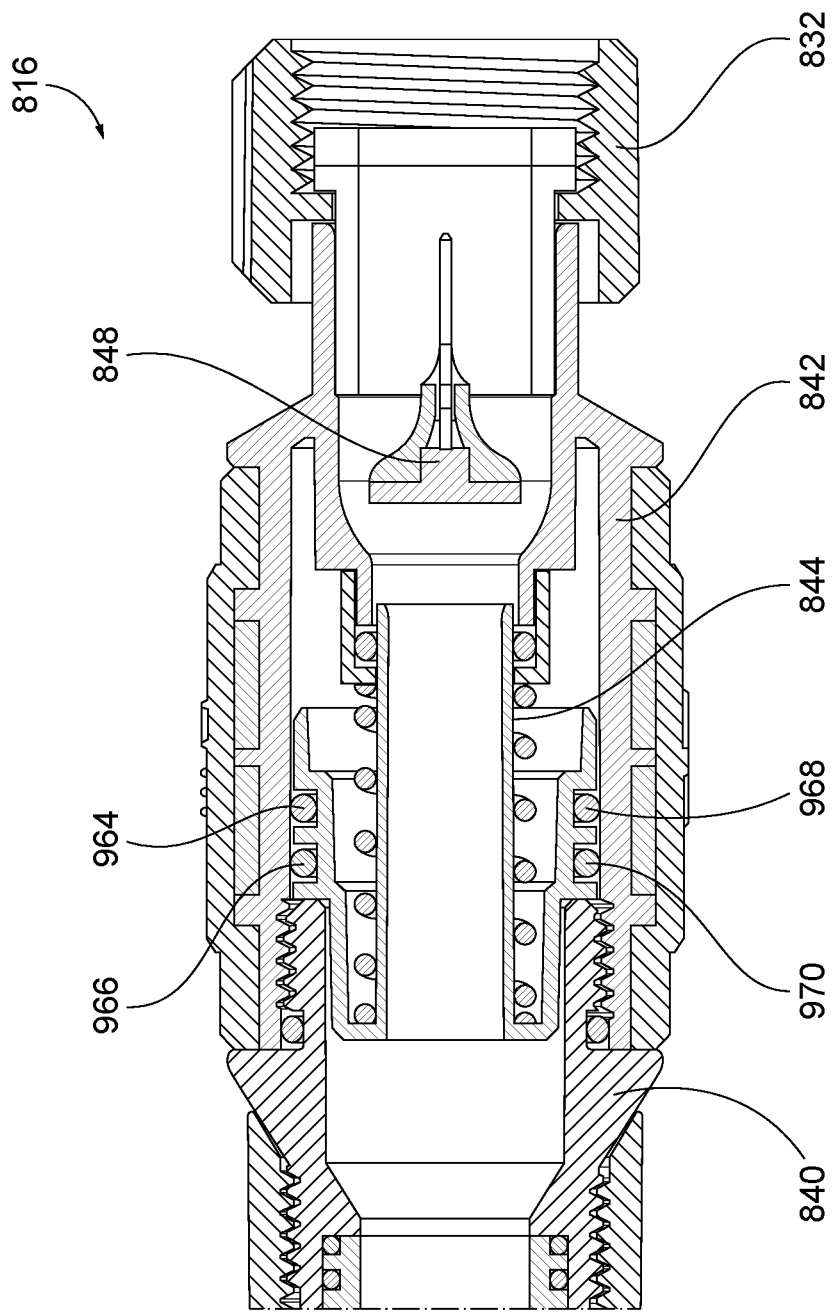
FIG. 16 is a cross-sectional view of the connector assembly in an open position.

Turning now to FIGS. 14-16, an exemplary embodiment of the first connector assembly is shown at 816. The first connector assembly 816 is substantially the same as the above-referenced first connector assembly 316, and consequently the same reference numerals but indexed by 500 are used to denote structures corresponding to similar structures in the assemblies. In addition, the foregoing description of the first connector assembly 316 is equally applicable to the first connector assembly 816 except as noted below.

The first connector assembly 816 includes a regulator assembly 830, a spigot connector 832 attached to one end of the regulator assembly 830, and a strain relief sleeve 834 that along with a hose assembly is attached to the other end of the regulator assembly 830.

The regulator assembly 830 includes a first housing 840, a second housing 842, a valve stem 844, a valve seat 848, and a spring seat 950. The first housing 840 has a first end 850 with an attachment mechanism for attaching to a first end of the second housing 842, for example by a threaded connection as shown, press fit, adhesive, etc., a second end 852 with an attachment mechanism for attaching to the strain relief sleeve 834, for example by a threaded connection as shown, press fit, adhesive, etc., and a passage 854 extending therebetween. An inner ledge 856 is defined in the passage 854 to be abutted by a tube connector 1020.

The second housing 842 has the first end 860 that connects to the spigot connector 832, a second end 862 that is sealed to the first housing 840 in a suitable manner, such as by a suitable seal, such as O-ring 954, and a passage 864 extending therebetween. The second housing can be at least partially surrounded by an overmold 952 or the like. The first end 860 connects to the spigot connector 832 in a suitable manner, such as by an intervening member 866 received in the spigot connector 832 and attached to the first end 860 by a suitable weld, adhesive, threaded connection, press fit, etc. The intervening member 866 may be coupled to the valve seat 848 in a suitable manner, such as by a tail 956 of the valve seat 848 received in a corresponding opening in a base 868 of the intervening member 866 and that includes a portion that seats against a top of the base 868. The intervening member 866 has a passage 958 with a plurality of spaced flow dividers forming one or more passages through which the fluid flows from the spigot. The second housing 842 also includes a portion 870 that extends in the passage 864 toward the second end 862 to surrounding a body 880 of the valve stem 844. The portion 870 is attached to the spring seat 950 in a suitable manner, such as by welding, adhesive, etc.

Turning now to the valve stem 844, the valve stem 844 has the body 880 with a passage 882 extending therethrough and a flanged portion 884 projecting outward from the body 880. A first side 886 of the flanged portion 884 serves as a spring seat for a spring 888. The flange portion 884 also includes an annular outwardly extending portion 962 defining a ledge that abuts the second end 852 of the first housing 840 in an open position. The outwardly extending portion 962 includes one or more seal grooves 964 and 966 for receiving a corresponding seal, such as O-rings 968 and 970 respectively, which move with the valve stem 844 to maintain a seal between the valve stem 844 and the second housing 842. The valve stem 844 is biased in the open position shown in FIG. 16 by the spring 888 and movable against the biasing force by fluid pressure to adjust flow through regulator assembly 830 to the closed position shown in FIG. 15. The spring seat 950 serves as a seat for the other end of the spring 388. The valve stem 844 moves within and is sealed against the spring seat 950 by a suitable seal, such as O-ring 972.

The valve seat 848 includes a seat 920 on an underside thereof that is contacted by the valve stem 844 in a closed position to block flow through the regulator assembly 830, for example when a high back pressure urges the stem 844 in the closed position. When the pressure reduces, the force of the spring 888 will move the valve stem 844 away from the seat 920. The stem 844 is movable between the open and closed positions to adjust the flow based on the pressure of the fluid passing through the regulator.

Figure 17:
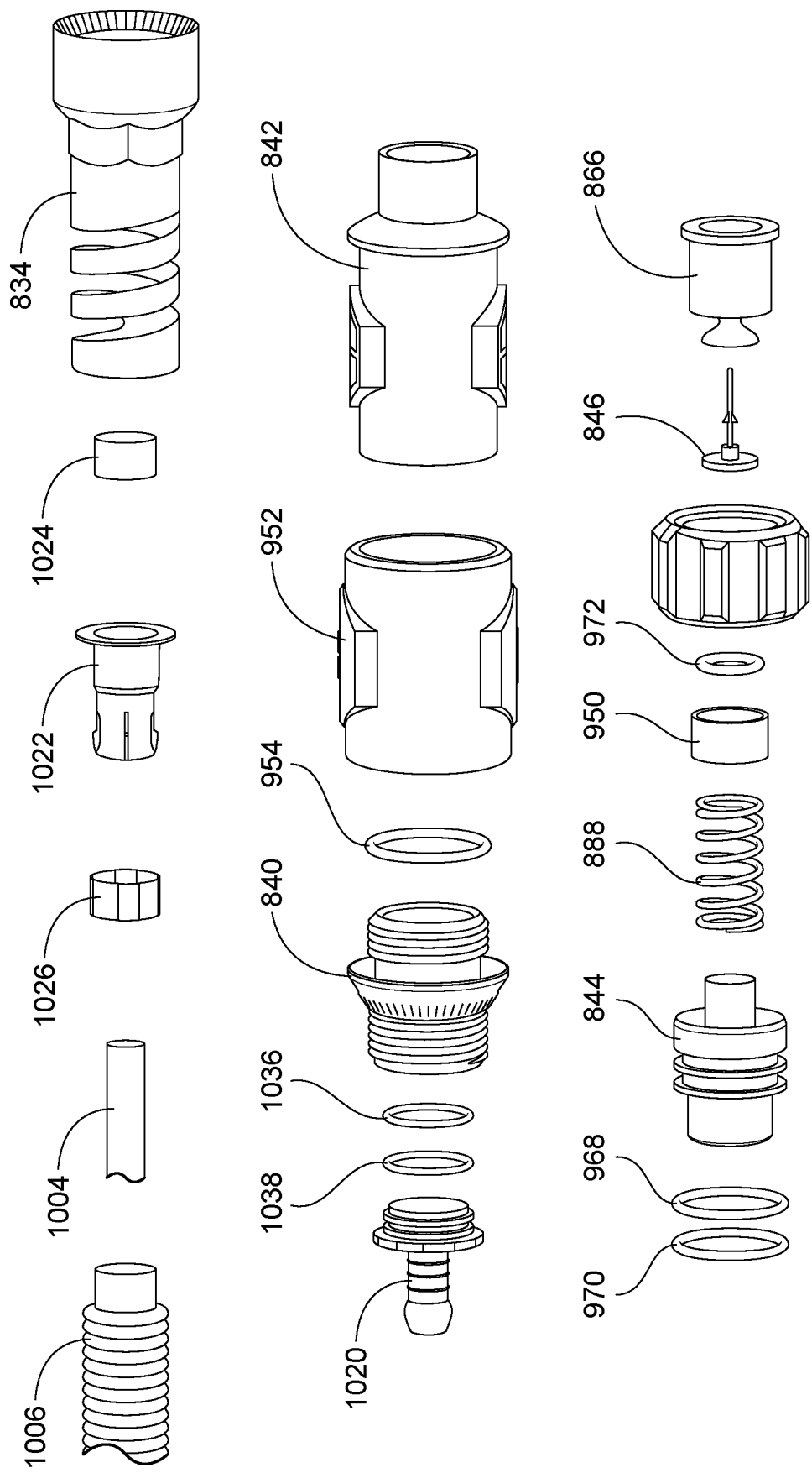
FIG. 17 is an exploded view of an exemplary hose.

Turning additionally to FIG. 17, an exploded view of the first connector assembly 816 is shown along with a first hose connector assembly, an inner hose member 1004, and an outer hose member 1006, which are substantially the same as the above described components. The first hose connector assembly 1000 includes a tube connector 1020, a collar 1022, a first retainer 1024, a second retainer 1026, and seals for sealing the tube connector 1020 to the first housing 840.

Figure 18:
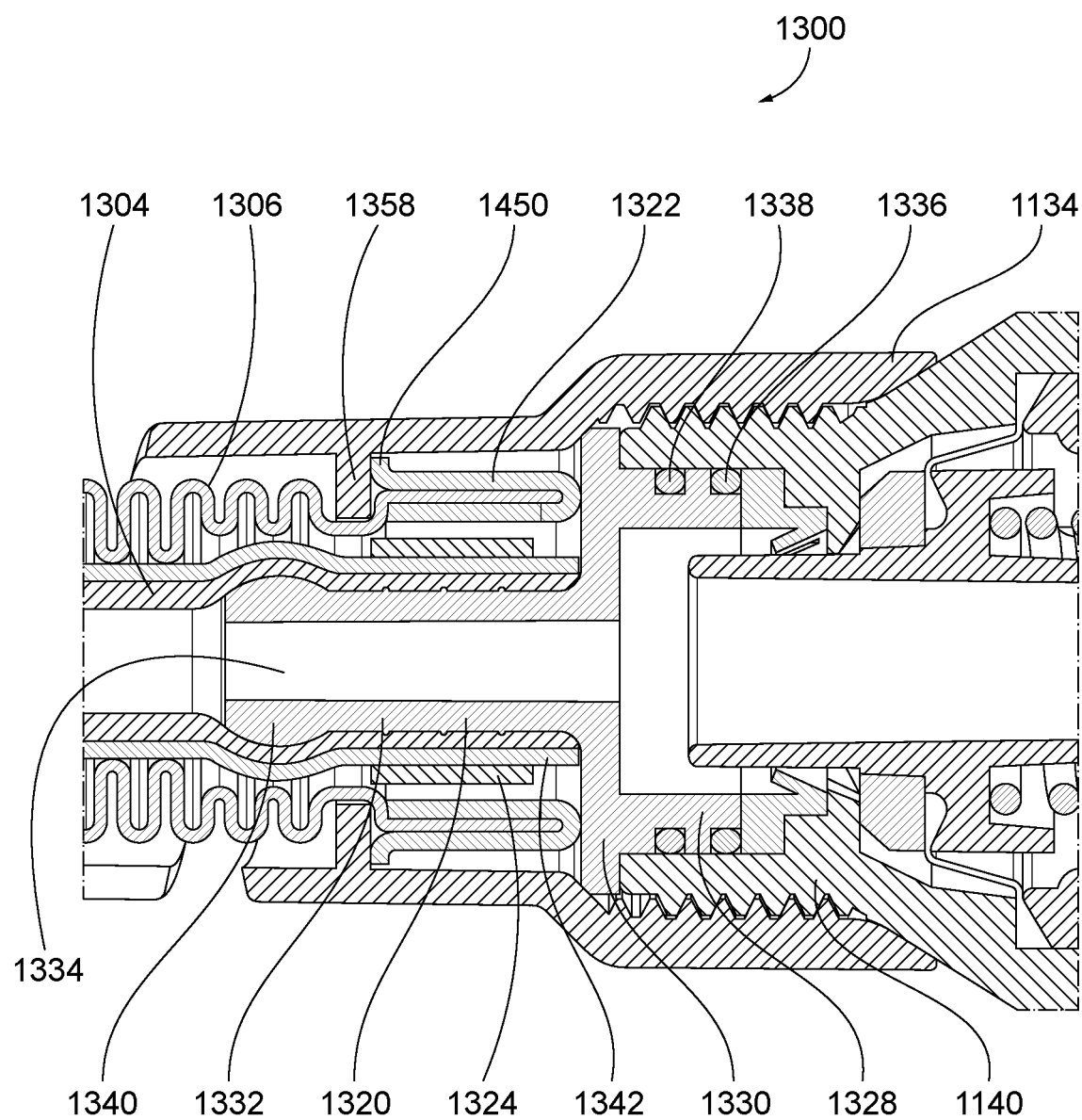
FIG. 18 is a cross-sectional view of a portion of another expandable hose.

Turning now to FIG. 18, an exemplary embodiment of a hose connector assembly is shown at 1300. The hose connector assembly 1300 is substantially the same as the above-referenced hose connector assembly 200, and consequently the same reference numerals but indexed by 1100 are used to denote structures corresponding to similar structures in the assemblies. In addition, the foregoing description of the hose connector assembly 200 is equally applicable to the hose connector assembly 1300 except as noted below.

The assembly includes a tube connector 1320, a collar 1322, and a retainer 1324. The tube connector 1320 includes a base 1328 having a flanged portion 1330, an elongate portion 1332 extending from the base 1328, and a passage 1334 extending through the base 1328 and elongate portion 1332. The base 1328 is disposed within an end of an outer housing 1140 and sealed thereto by one or more suitable seals, such as O-rings 1336 and 1338, and the flanged portion 1330 is held between the of the outer housing 1140 and an inner surface of the strain relief sleeve 1134 to couple the tube connector 1320 to the first connector assembly. The elongate portion 1132 receives a first end of the inner tube 1304 and includes a bulbous or radiused end 1340 over which the first end of the inner tube is received. The first end of the inner tube 1304 is held on the elongate portion 1332 by the retainer 1324, which may be a suitable clamp or the like. A sleeve 1342, which may be a gasket, tape, mesh, or the like, may be provided between the inner tube 1304 and the retainer 1324 to provide protection to the inner tube 1304 at the connection point, and the sleeve may extend a distance around the inner tube 1304 past the end 1340.

The collar 1322, which may be made of a suitable material, such as metal, is clamped around a first end of the outer jacket 1306 and includes a ledge 1450 that abuts an inner ledge 1358 of the strain relief 1134. The collar 1322 is held between the ledge 1358 and the flanged portion 1330 of the tube connector 1320.

It will be appreciated that the hose connector assembly 1320 may be used with any of the above described regulator assemblies, and may be utilized with the second end of the hose.

It will be appreciated that the above gaskets and seals may be made of a suitable material, such as rubber, such as a nitrile rubber.

Although certain embodiments have been shown and described, it is understood that equivalents and modifications falling within the scope of the appended claims will occur to others who are skilled in the art upon the reading and understanding of this specification.

What is claimed is:

1. A hose comprising:
a first connector assembly including a regulator assembly configured to regulate a flow of fluid through the hose to reduce a pressure of the fluid, the regulator assembly including a body, and a fluid connector upstream of and coupled to the regulator assembly, the fluid connector configured to be coupled to a spigot;
a second connector assembly; and
a hose assembly coupled to the first and second connector assemblies, the hose assembly including an inner hose member having first and second ends, an outer hose member having first and second ends, a first hose connector assembly coupled to the first ends of the inner hose member and outer hose member and the first connector assembly, the first hose connector assembly including a first tube connector having a portion disposed in the body of the regulator assembly and a portion coupled to the first end of the inner hose member, and a second hose connector assembly coupled to the second ends of the inner hose member and outer hose member and the second connector assembly, the second hose connector assembly including a second tube connector coupled to the second end of the inner hose member.

2. The hose according to claim 1, wherein the first tube connector includes an elongate portion having a bulbous end over which the first end of the inner hose member is received.

3. The hose according to claim 1, wherein the second tube connector includes an elongate portion having a bulbous end over which the second end of the inner and outer hose members are received.

4. The hose according to claim 1, wherein the first hose connector assembly includes a collar surrounding the first tube connector, the collar being coupled to the first end of the outer hose member.

5. The hose according to claim 4, further including a first retainer for holding the inner hose member on the tube connector and a second retainer for holding the outer hose member on the collar.

6. The hose according to claim 5, wherein the collar includes a passage having first portion for accommodating the inner hose member, the first retainer, and an elongate portion of the tube connector, a second portion for accommodating the inner hose member and the elongate portion, and a third portion for accommodating the inner hose member.

7. The hose according to claim 6, wherein the collar curves outward at an end of the third portion.

8. The hose according to claim 4, wherein the collar has first and second ends, a plurality of circumferentially spaced fins at the second end, and a groove for receiving the first end of the outer hose member.

9. The hose according to claim 4, wherein the first connector assembly additionally includes a strain relief sleeve coupled to the body of the regulator assembly, the strain relief sleeve including an inner ledge, wherein a flanged portion of the tube connector and a flanged portion of the collar are held between the inner ledge and an end of the regulator assembly.

10. The hose according to claim 1, wherein the body of the regulator assembly has a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

11. The hose according to claim 10, wherein the first tube connector includes a base having a flanged portion, and an elongate portion extending from the base and having a bulbous end over which the first end of the inner hose member is received.

12. The hose according to claim 11, wherein the first connector assembly additionally includes a strain relief sleeve coupled to the second end of the body, the strain relief sleeve including an inner ledge, wherein the flanged portion of the tube connector is held between the inner ledge and the second end of the body.

13. The hose according to claim 1, wherein the first connector assembly additionally includes a strain relief sleeve coupled to the body of the regulator assembly to couple the first hose connector assembly to the regulator assembly.

14. A hose comprising:
an inner hose member having first and second ends;
an outer hose member having first and second ends and surrounding the inner hose member;
a hose connector assembly coupled to the first ends of the inner hose member and outer hose member, the hose connector assembly including a tube connector coupled to the first end of the inner hose member;
a regulator assembly coupled to the hose connector assembly and configured to regulate a flow of fluid through the hose to reduce a pressure of the fluid, the regulator assembly including a body having a first end coupled to a fluid connector and a second end coupled to the hose connector assembly, wherein a portion of the tube connector is disposed in the body; and
the fluid connector upstream of and coupled to the regulator assembly, the fluid connector being rotatable relative to the regulator assembly for coupling to a spigot.

15. The hose according to claim 14, wherein the regulator assembly includes a valve stem disposed in the body, and a valve seat disposed in the body, wherein the valve stem is biased in an open position and movable to a closed position against the valve seat blocking flow through the regulator assembly.

16. The hose according to claim 14, wherein the hose connector assembly includes a collar surrounding the tube connector and being coupled to the first end of the outer hose member.

17. The hose according to claim 14, further including a first retainer for holding the inner hose member on the tube connector and a second retainer for holding the outer hose member on the collar.

18. The hose according to claim 14, wherein the tube connector includes an elongate portion having a bulbous end over which the first end of the inner hose member is received.

19. A hose comprising:
an inner hose member having first and second ends;
an outer hose member having first and second ends and surrounding the inner hose member;
a first hose connector assembly coupled to the first ends of the inner hose member and outer hose member, the first hose connector assembly including a tube connector having a base with a flanged portion and an elongate portion extending from the base and having a bulbous end over which the first end of the inner hose member is received;
a second hose connector assembly coupled to the second ends of the inner hose member and outer hose member;
a regulator assembly coupled to the first hose connector assembly and configured to regulate a flow of fluid through the hose to reduce a pressure of the fluid, the regulator assembly including a body having a first end and a second end, the second end being coupled to the first hose connector assembly, a valve stem disposed in the body, and a valve seat disposed in the body, the base of the tube connector being disposed in the body;
a fluid connector coupled to the first end of the body for coupling to a spigot; and
a strain relief sleeve removably coupled to the second end of the body, the strain relief sleeve including an inner ledge,
wherein the flanged portion of the tube connector is held between the inner ledge and the second end of the body.

20. The hose according claim 19, wherein the second hose connector assembly includes a tube connector coupled to the second end of the inner hose member, and wherein the tube connector of the second hose connector assembly has a cross-sectional area that is smaller than a cross-sectional area of the tube connector of the first hose connector assembly.

* * * * *